March 20, 1928.

H. R. SETRIGHT 1,663,467

TICKET PRINTING AND ISSUING MACHINE

Filed May 21, 1923

Inventor:
H. R. Setright

March 20, 1928. 1,663,467
H. R. SETRIGHT
TICKET PRINTING AND ISSUING MACHINE
Filed May 21, 1923 9 Sheets-Sheet 2

Inventor.
H. R. Setright
By Marbox Clerk
Atty's.

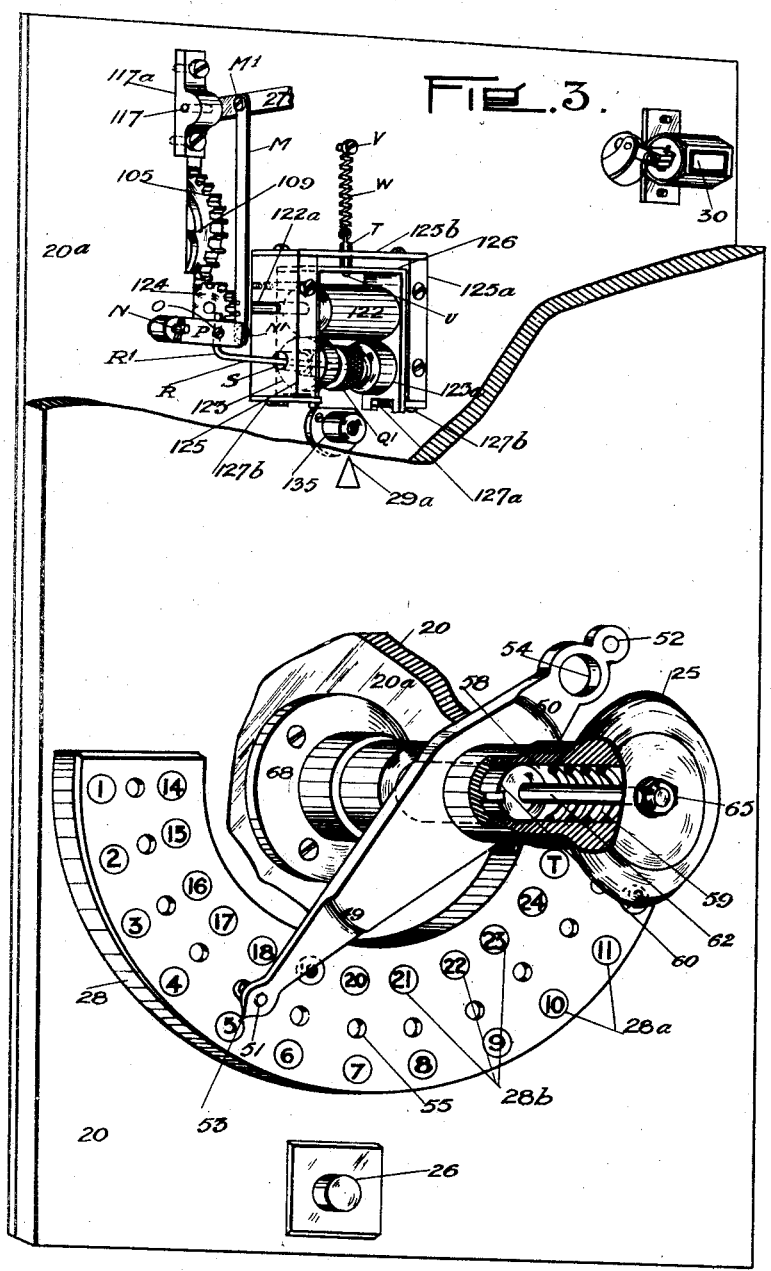

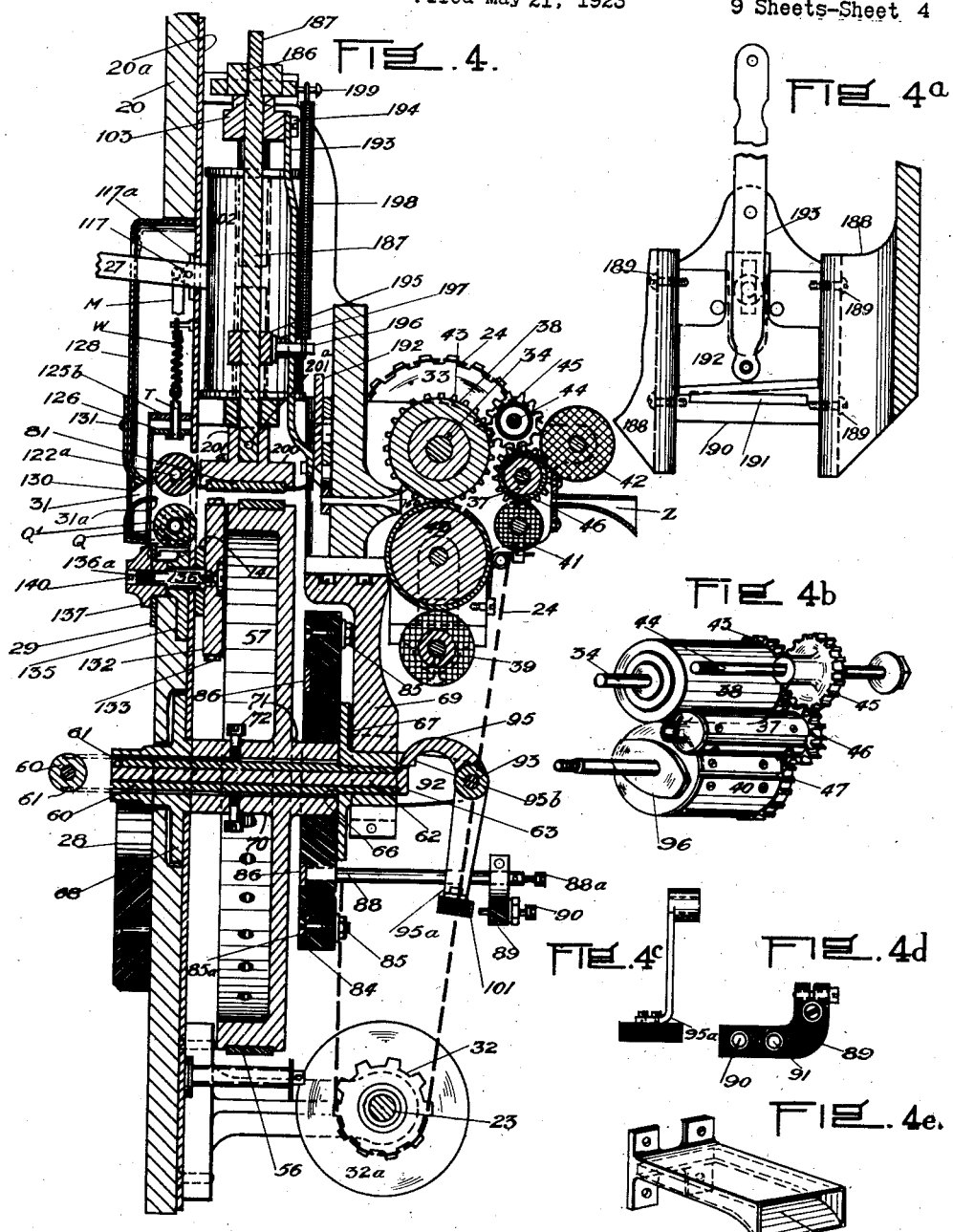

March 20, 1928.
H. R. SETRIGHT
TICKET PRINTING AND ISSUING MACHINE
Filed May 21, 1923 9 Sheets-Sheet 5
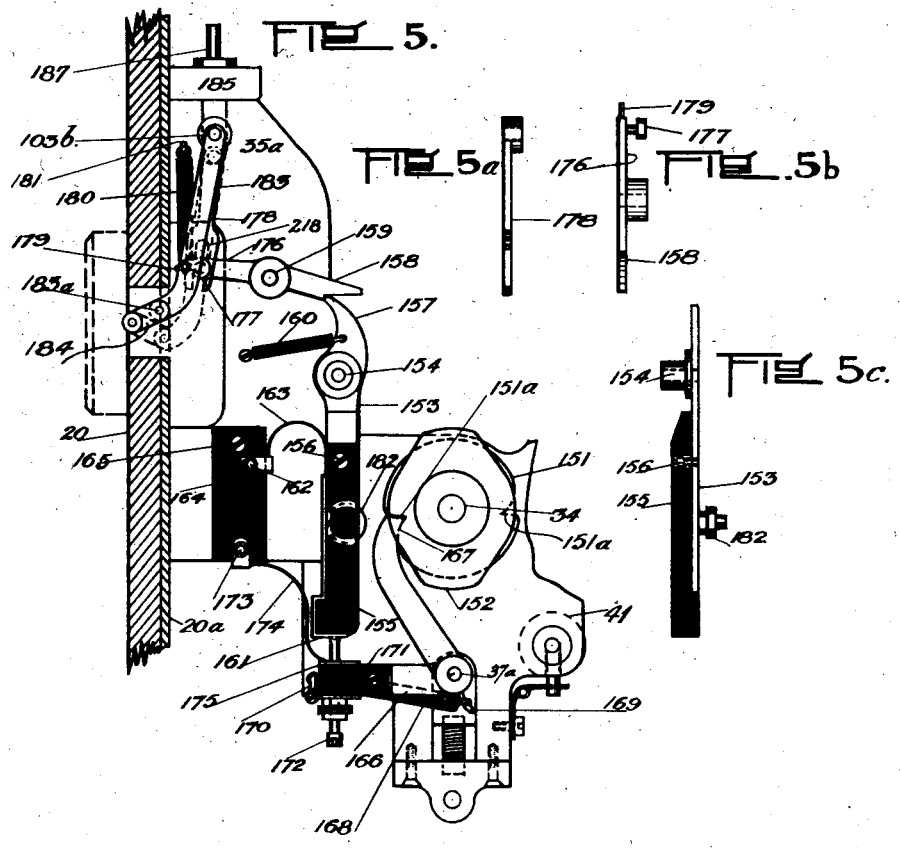
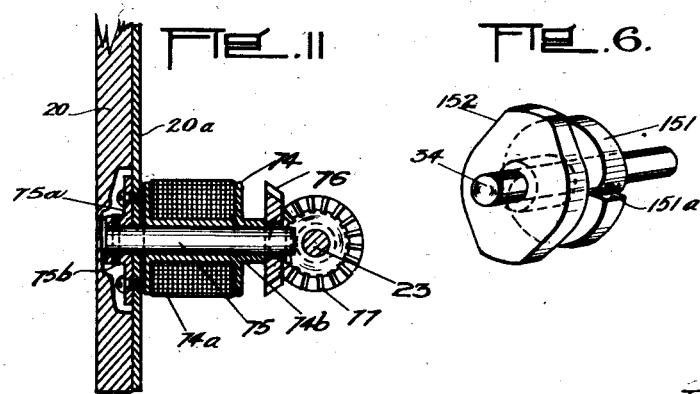
Inventor:
H. R. Setright
By Marker Clerk
Attys.

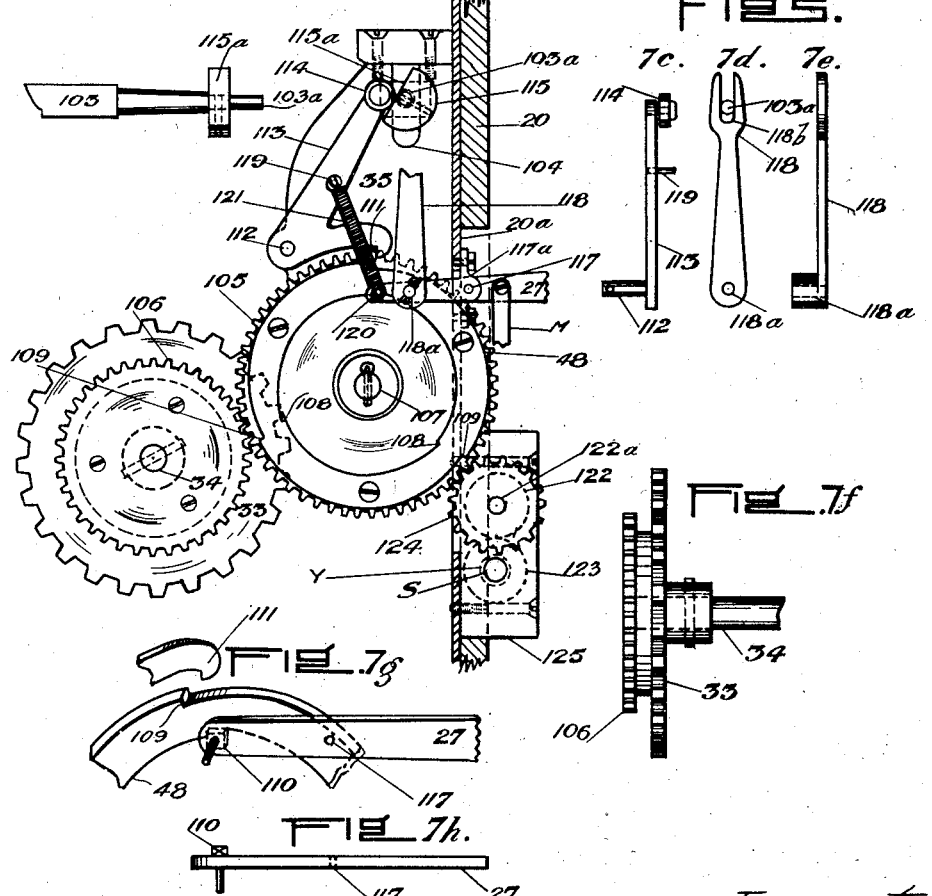

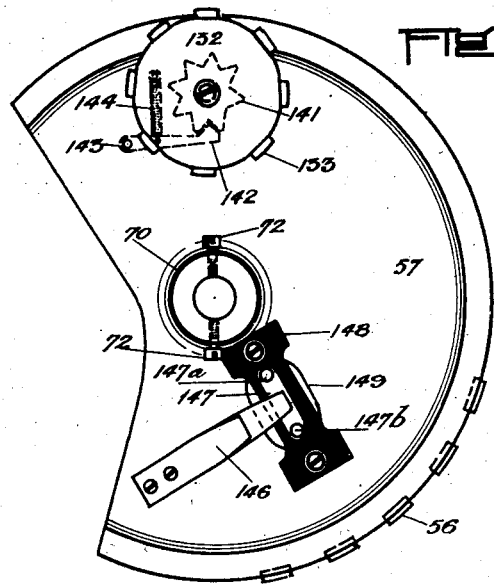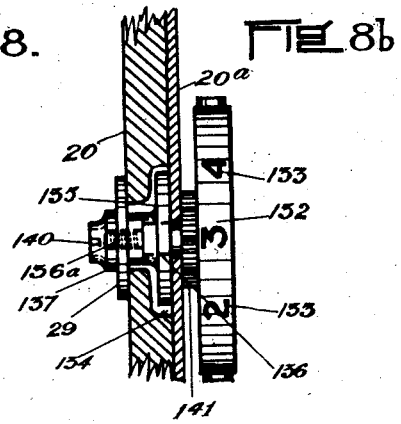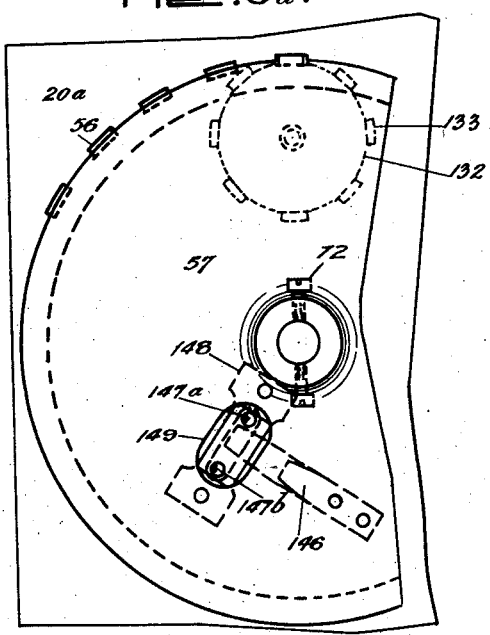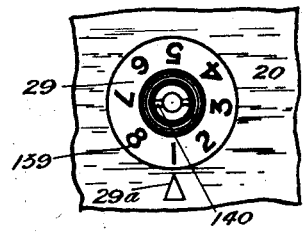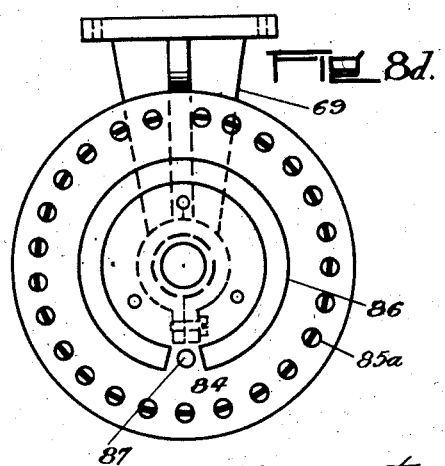

March 20, 1928.
H. R. SETRIGHT
1,663,467
TICKET PRINTING AND ISSUING MACHINE
Filed May 21, 1923
9 Sheets-Sheet 8
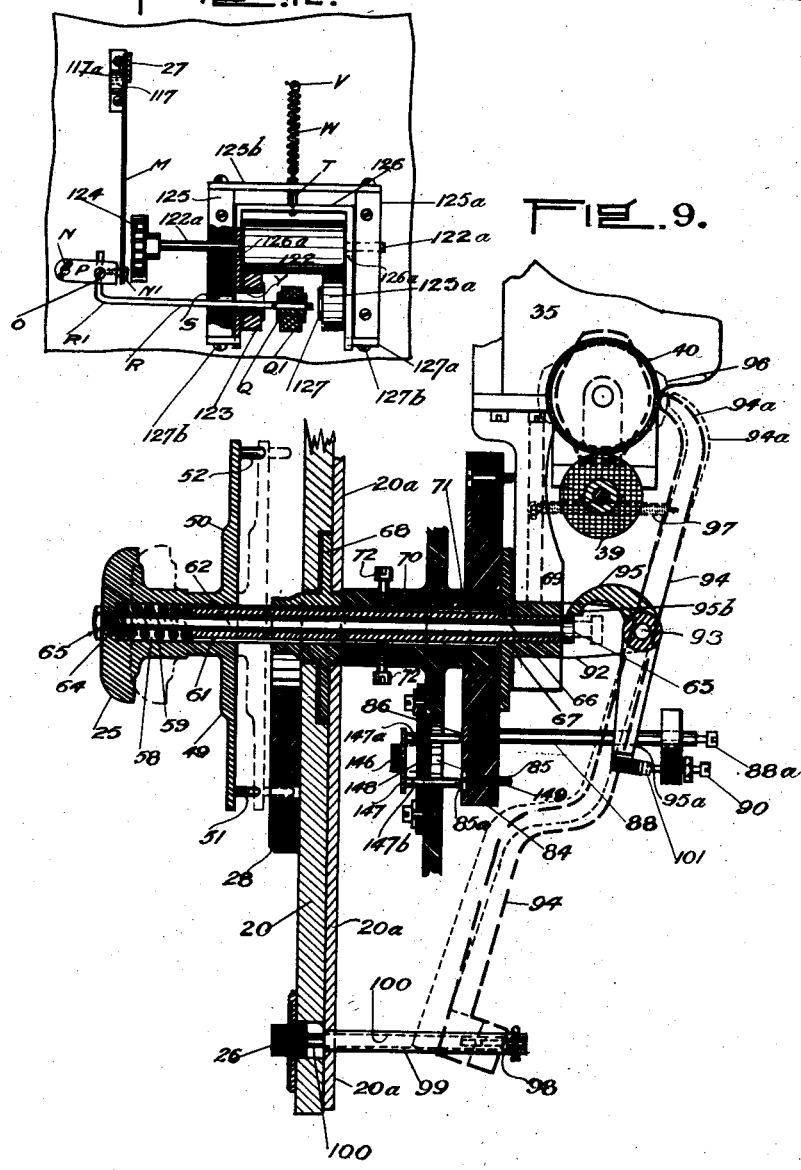
Inventor
H. R. Setright
By Marks & Clerk
Attys.

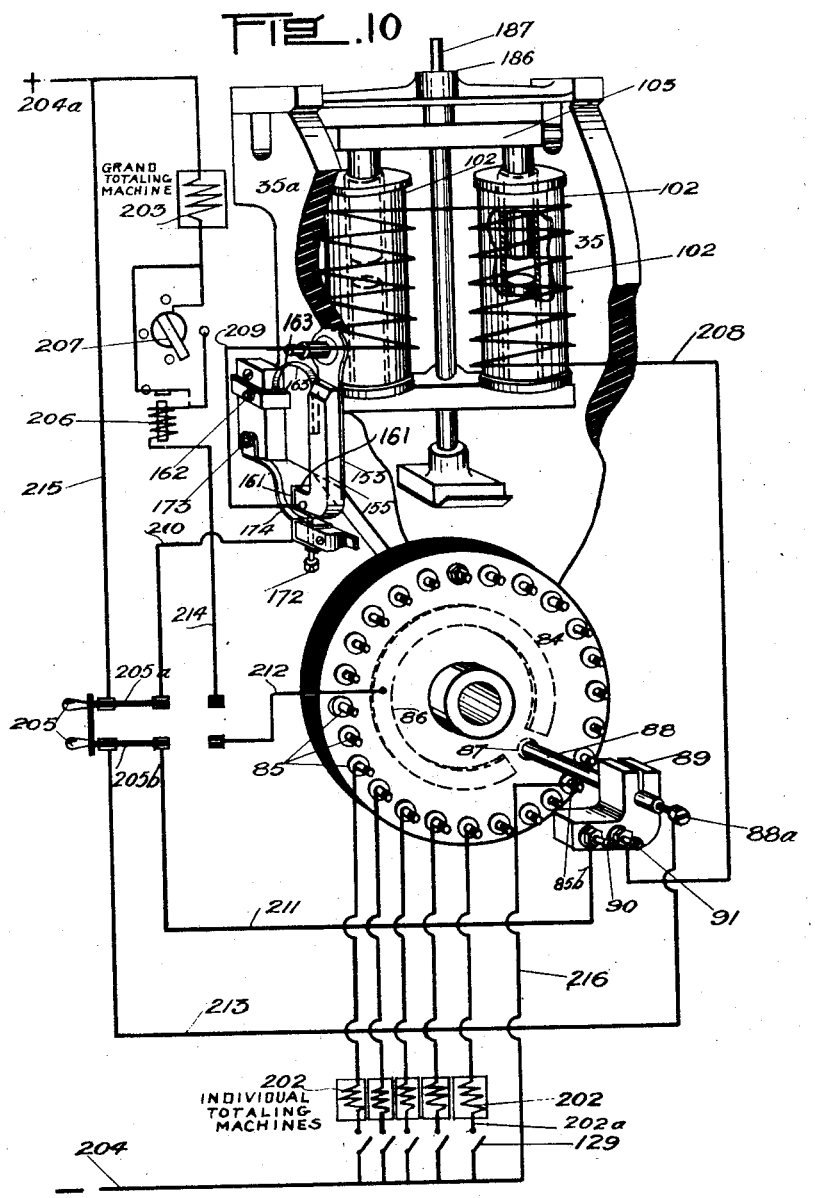

Patented Mar. 20, 1928.

1,663,467

UNITED STATES PATENT OFFICE.

HENRY ROY SETRIGHT, OF NEWTOWN, NEW SOUTH WALES, AUSTRALIA.

TICKET PRINTING AND ISSUING MACHINE.

Application filed May 21, 1923, Serial No. 640,603, and in Australia July 20, 1922.

This machine is principally for use with electrically operated automatic totalling machines such the totalizators in use at various race-courses, but it is also adapted to be used for printing and issuing tickets or checks that are used for railway and tramway purposes, or at theatres and other amusement houses.

The main object of the invention is to so construct and arrange the issuing machine that under normal working conditions it is impossible for the machine to print the distinctive numerals, letters or characters that distinguish an authentic ticket until an electric impulse has been passed to the recording and totalling mechanism.

In existing ticket issuing machines, some possess the disadvantage of using pre-printed tickets, which are delivered from the machine by the manual act of depressing a lever or turning a handle for the particular denomination required, which exposes any systems to which such machines are applied to the danger of fraudulent use of such pre-printed tickets or checks. Other ticket issuing machines which print tickets on paper which is fed into the machine from a roll of paper possess the aforementioned fault to a greater or lesser degree, and although various devices are used to prevent the issue of unauthentic tickets, the fact that such tickets can be fully printed without actuating the related individual recording apparatus constitutes a possibility for fraudulent manipulation.

Other tickets issuing machines which rely on electro-magnetic devices to release their feeding and printing mechanism are defective because the character printing and cutting off is performed by power distinct from the power that operates the separate recording apparatus and the machines of this latter class are also unapplicable to recording devices where a plurality of issuing machines are required to operate on one electro-magnet.

Furthermore existing ticket printing and issuing machines which are applicable to recording and indicating machines such as automatic totalizators, are unsatisfactory by reason of the complicated nature of their mechanism and the consequent heavy cost of manufacture.

My invention substantially simplifies and reduces the amount of mechanism necessary for the purpose of feeding from a roll of paper, printing, cutting off, ejecting and recording the total issue of tickets, and for directing an electrical impulse of the correct duration to the desired or selected unit of an electro-magnetically operated recording and indicating apparatus such as a totalizator where the issue of any such tickets are required to be registered on the particular unit corresponding to the character of the imprint of each ticket.

The invention is particularly intended to prevent fraudulent manipulation of tickets, or the issue of an unregistered or unauthentic ticket, and this object is attained by providing that the character or selective printing and cutting off mechanism is positively controlled by an electro-magnet of special construction which can only be energized in effective positions by the same electrical impulse or circuit that energizes the electro-magnets which govern the registrations of the related units in the recording and indicating apparatus.

The invention in practice increases the the number of tickets that can be issued in a given time by selective operation as compared with existing issuing and printing machines by providing that a ticket length is automatically fed into position to receive its distinctive imprint simultaneously with the ejection of the last selected ticket.

The operation of the machine is further expedited by the provision of a novel form of selector indexing device by means of which the desired distinctive character is selected for the ticket imprint.

The speedy and correct functioning of my invention is further ensured by providing that the speed at which it is power driven, is not required to be definitely proportional to the speed at which other electrical distributing apparatus in the related system is driven.

The invention has been designed with the further object of eliminating the disabilities of other machines referred to above. It comprises a manually operated press handle electro-magnetically controlled power driven machine for automatically feeding paper from a roll thereof, for printing, cutting off and ejecting tickets or checks from a roll of paper, for varying the imprint on such tickets by the provision of a selective range of characters or numerals or both, for mechanically recording the number of tickets issued, and for directing an electrical impulse to separate electro-magnetic recording apparatus which register the number of tickets issued of each denomination.

In order that the invention may be thoroughly understood it will now be more particularly described and reference will be made to the accompanying sheets of drawings in which:—

Fig. 1 is a perspective view of the mechanism attached to the underside of a base plate or board which is hinged to the driving shaft, the base plate having been raised to a vertical position.

Fig. 1ᵃ is a detail sectional perspective view showing the press button, and the lever directly operated thereby, for releasing the operating press handle when the operator has inadvertently engaged the press handle stud with an index perforation related to a recording machine temporarily out of circuit with the issuing machine.

Fig. 2 is a perspective view of the mechanism attached to the underside of the base plate but viewed from another angle to that shown at Fig. 1, certain portions of the mechanism and base plate having been cut away to show the operating press handle with its attachments and their position relative to the other parts of the machine, while portions of the ink ribbon, its bobbins and bevel gear, the driving shaft, press button and its connections have also been cut away to give a clearer view of the remaining parts of the mechanism.

Fig. 3 is a perspective view of the upper face of the base plate partly in section showing the operating press handle and its connections the selective index and press button release, while portion of the base plate is cut away to show the ticket ejecting rollers and mechanical counter in their relative positions and their connection to the underlying parts.

Fig. 4 is a central sectional elevation of the machine with the operating press handle and its distinctive arms removed, the view being taken from the direction indicated by the arrow, at Fig. 2.

Figure 1:
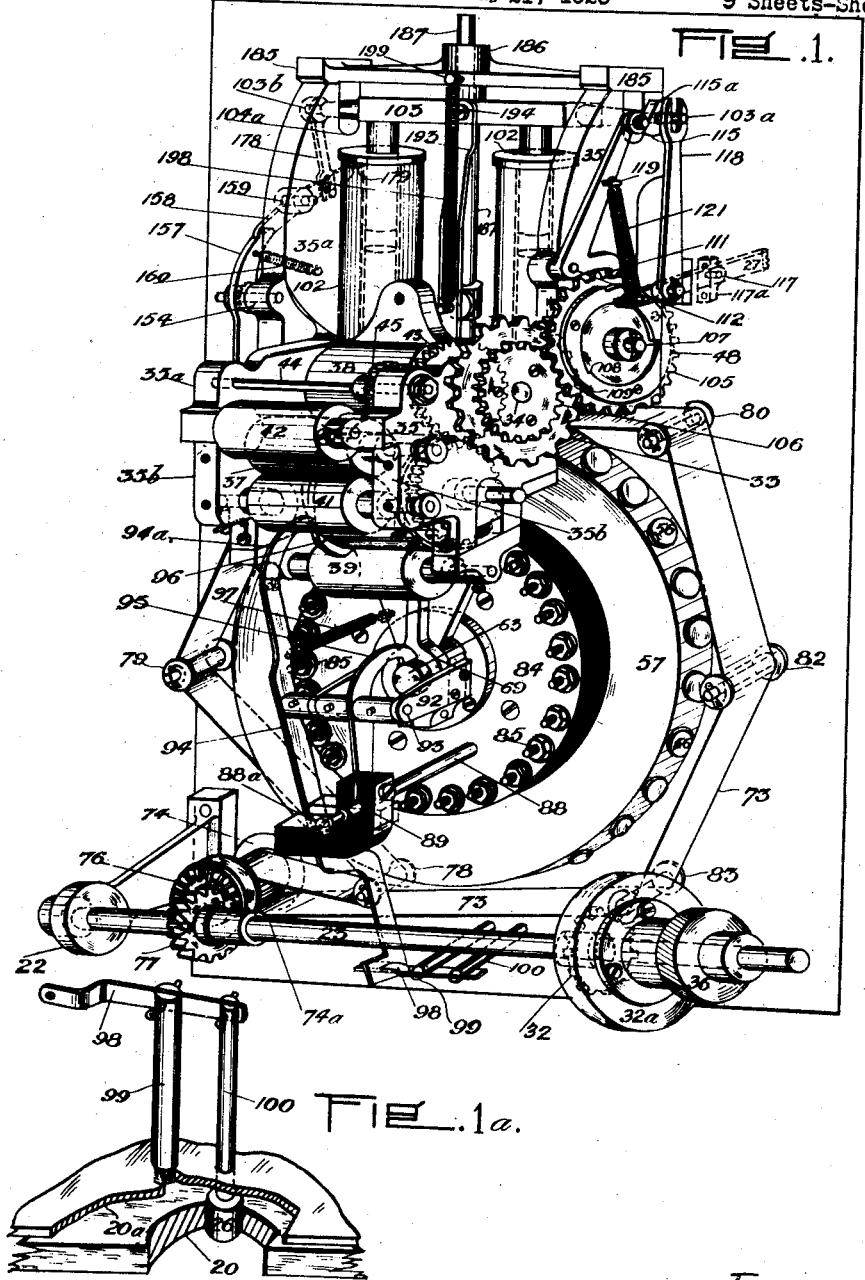

Fig. 4ᵃ is a detail view showing the guillotine knife and its co-acting cutting member secured to the frame.

Fig. 4ᵇ is a perspective view of the type, inking and platen rollers showing the manner in which they are geared together.

Fig. 4ᶜ is a detail view showing the catch-contact at right angles to the position shown at Fig. 4, the catch itself having been removed.

Fig. 4ᵈ is a detail view showing the adjustable bracket carried by the pedestal that is secured to the selective contact disc, at right angles to the position shown at Fig. 4.

Fig. 4ᵉ is a perspective view of the bell-mouthed guide channel for ensuring the ready feeding of paper to the machine.

Fig. 5 is a side elevation of the trip switch and its operating mechanism, showing also the connecting link between the electro-magnet armature and the mechanical counter.

Fig. 5ᵃ is a side view of the forked arm which depresses the catch pawl that engages the long arm of the trip switch.

Figs. 5ᵇ and 5ᶜ are detail views showing, respectively, the catch pawl and the long arm of the trip switch at right angles to the position in which they are seen at Fig. 5.

Fig. 6 is a perspective view, partly in section, showing the cams that operate the trip switch at certain periods in each sequence of operations.

Fig. 7 is a side elevation of the mechanism that automatically controls the feed of paper into the machine, the sprocket wheel that is driven from the main driving shaft, the paper release lever that enables the paper to be fed straight through the machine for certain purposes and the driving wheel of the ticket ejecting rollers.

Figs. 7ᵃ and 7ᵇ are respectively a plan and side elevation of the yoke that connects the two sides of the frame in which the underneath mechanism is mounted.

Fig. 7ᶜ is a side view of the pawl that engages the outer stops of the double faced cam which controls the rotation of the various printing rollers and the ticket issuing or ejecting rollers.

Fig. 7ᵈ is a front view of the forked lever that releases the pawl that engages the inner stops of the double faced cam when it is depressed by the movement of the armature when the latter is energized, this part being only partly shown at Fig. 7.

Fig. 7ᵉ is a side view of Fig. 7ᵈ.

Fig. 7ᶠ is a side view of the sprocket wheel that is driven from the main driving shaft, a gear wheel being cut upon or rigidly secured to the face thereof and showing the manner in which it is secured to the shaft that carries the main platen rollers.

Fig. 7ᵍ is an enlarged view of portions of the double faced cam and the pawls that engage with the stops cut upon the faces of the cam.

Fig. 7ʰ is a view of the lever that carries the pawl that engages with the stops cut upon the inner face of the double faced cam, the view being taken at right angles to the position from which it is viewed at Fig. 7ᵍ.

Fig. 8 is an underneath plan of portion of the selective printing disc that carries the authentication numerals, letters or characters and the rubbing contact that closes the circuit through the common ring or test contact and the terminal contacts which are mounted upon the selective contact disc, and showing the relative position of the supplementary selective printing disc.

Fig. 8ᵃ is a top plan of portion of the selective printing disc, and the rubbing contact that rotates therewith the supplementary printing disc being shown in position relative to the main disc.

Fig. 8$^b$ is a side view of the supplementary printing disc, showing portion of the base plate and the base board in section, the indicating dial and the automatic stop.

Fig. 8$^c$ is a front view of the pointer and the indicating dial by means of which the selected numeral, letter or character on the supplementary printing disc is brought into the printing position.

Fig. 8$^d$ is a plan of the selective contact disc and bracket by which it is carried.

Fig. 9 is a part section taken vertically through the axial line of the manually operated press handle when the machine is raised to the vertical position.

Fig. 10 is an electrical chart showing the arrangement of the various circuits through the machine to the recording and totalling mechanism.

Fig. 11 is a central sectional elevation of the inking roller that drives the inking tape showing the means by which it is driven.

Fig. 12 is a view similar to the view of the ticket ejecting rollers and associated parts shown in connection with Fig. 3.

The machine selected for the purpose of describing and illustrating my invention is one adapted to be used in conjunction with recording and totalling mechanism of a totalizator used on various race-courses.

The machine is mounted upon any suitable horizontal base plate 20$^a$ securely fastened to a base board 20. Rigidly secured to the base plate 20$^a$ are a pair of brackets 21 provided with bearings or collars 22 adapted to embrace the shaft 23 by which the machine is driven, the other end of the base being suitably supported in any convenient manner. By this arrangement the machine may be swung upwardly upon the driving shaft to a vertical position to permit access to the underneath mechanism without having to first disconnect the driving belt or sprocket chain.

The bulk of the machine is mounted upon a frame of suitable non-magnetic material that is rigidly secured to the underside of the base plate 20$^a$ the operating selector handle 25, press button release 26, paper release lever 27, semi-circular selective index 28, positioning dial 29 and pointer 29$^a$ mechanical counter dial 30 and the ticket issuing orifice 31 being the only parts upon or projecting above the upper face of the base board 20.

The machine is driven by a sprocket wheel 33 connected by a sprocket chain 24 to a sprocket wheel 32 rigidly secured to the shaft 23. The pulley wheel 32$^a$ is driven by a belt and pulley wheel fixed upon a conveniently situated power shaft (not shown in the drawings) which may if necessary be used for driving a series of ticket printing and issuing machines.

Rigidly secured to or integral with the pulley wheel 32$^a$ is a friction clutch 36 that is adapted to clutch and drive the shaft 23 when the sprocket wheel 33 is free and to freely rotate upon the shaft 23 when that gear wheel is locked in a manner that will be hereafter explained. The sprocket wheel 33 is keyed or otherwise rigidly secured to the shaft 34 that is mounted in suitable bearings carried by the side members 35 and 35$^a$ of the frame.

The type of ticket printing and issuing machine illustrated in the accompanying drawings is that in which printed matter is impressed upon both sides of the ticket, suitably positioned blanks being provided in the type matrix that prints the obverse face of the ticket so that authentication numerals, letters or characters may be printed upon those blank spaces before the ticket issues from the machine. The printing of the general matter upon the obverse face of the ticket is effected by the type roller 40, platen roller 38 and inking roller 39, the printing on the reverse side of the ticket being effected by the type roller 37, platen roller 41 and inking roller 42, the printing in both cases being done as the ticket paper passes between the printing rollers and their coacting platen rollers.

The roller 38 and gear wheel 43 are rigidly secured in any suitable manner to the shaft 34 that is driven by the sprocket wheel 33. The gear wheel 43 meshes with a transmission wheel 45 mounted upon a shaft 44, rigidly secured to the side member 35 and 35$^a$ and meshes with a gear wheel 46 that is secured to and drives the printing roller 37, the gear wheel 46 meshing with the gear wheel 47 that is secured to and drives the printing roller 40. The rollers 37, 39, 40, 41 and 42 are all mounted upon shafts carried by bearings secured to the side members 35 and 35$^a$ in any suitable manner the roller 39 being caused to rotate by frictional contact with the driven roller 40 while the rollers 41 and 42 will be caused to rotate by frictional contact with the driven roller 37.

In cases where it is only required to have the authentication numerals, letters or characters printed upon the ticket, the printing rollers, as such, may be dispensed with, the rollers 37, 39, 41 and 42 and the transmission wheel 45 being entirely removed. The paper would in that case be fed in through the bell-mouthed intake Z to the rollers 38 and 40 which would be in frictional contact with each other and would act merely as feed rollers.

The paper is fed in through a bell-mouthed guide channel Z secured to the frame at 35$^b$ and onwardly between the rollers 37 and 41, and from thence between the rollers 38 and 40, from a bobbin (not shown in the drawings) placed in any convenient position. The rotation of all these rollers will be controlled by the movement of a cam 48 which is controlled by the electro-magnet armature or by the release lever 27 in a manner that will be hereafter explained.

The operating press handle 25 shown particularly at Figs. 2, 3, 4 and 9 is used in conjunction with a semi-circular selective index 28 which acts as a medium for determining the correct position for the operating press handle. The handle 25 is provided with oppositely extending radial arms 49 and 50, which are integral with or rigidly secured to the handle and are provided with pins 51 and 52 near their outer extremities. The arm 49 is tapered outwardly to its extremity to form a pointer 53 which points to any of the index characters 28$^a$ in the outer curve as the handle is turned within a semi-circle. The other arm 50 is enlarged at a point inside the pin 52 such enlargment being provided with a circular opening 54 through which any of the index characters 28$^b$ in the inner curve may be viewed or sighted by the operator as the handle is turned within a semi-circle. The pointer 53 and the opening 54 are for the purpose of enabling the operator to quickly position the handle 25 before depressing it to ensure that either of the pins 51 or 52 will engage with the perforations 55 situated in a curve intermediately between the inner and outer index characters. This construction and arrangement of the selective index and the arms provide a means whereby a large number of characters may be employed within the limits of a semi-circle of comparatively small radius, each character having its corresponding printing type character 56 on the periphery of a printing disc 57 that is rotated with and by the handle 25 so that the characters 56 on any part of the circumferential face of the printing disc 57 may be brought to a predetermined definite printing position by bringing either one or the other of the pins 51 or 52 into axial line with the perforations 55.

The handle 25 is drilled axially and is counterbored from the rear to form a circular recess 58 to accommodate a spring 59 and the outer end of a sleeve shaft 60 (Fig. 3), which is recessed longitudinally at 61 to receive a feather key projecting from the inner face of the recess 58. A central shaft 62, provided at its rear end with a round head 63, passes through the sleeve shaft 60 and handle 25 the forward end being screw threaded to enable it to engage with a female thread 64 in the handle 25 and to be rigidly secured thereto by a nut 65. The helical spring 59 surrounds the shaft 62 and is normally held partly in compression between the head of the recess 58 and the forward end of the sleeve shaft 60, the head 63 of the shaft 62 normally lying upon the end of the sleeve shaft 60. The sleeve shaft 60 is provided with a shoulder 66 which abuts against a flanged bearing 67 in which it is free to rotate. The base plate 20$^a$ is provided with a bearing 68 in which the sleeve shaft 60 may rotate, the flanged bearing 67 being carried by a bracket formation 69 on the frame. Mounted upon the sleeve shaft 60 is a printing disc 57 provided with bosses 70 and 71 and set screws 72 by which the disc is rigidly secured to the shaft.

The endless inking tape 73 (Fig. 1) is driven by the bobbin 74 (Fig. 11) that is rotatably mounted upon a short fixed shaft 75, one end of which is rigidly secured, by means of the pin 75$^b$, in a flanged bearing 75$^a$ that is securely fastened to the base plate 20$^a$, the barrel of the bobbin 74 being extended at 74$^b$, such extensions being provided with a bevel gear 76 that gears with a bevel gear wheel 77 keyed or otherwise secured to the driven shaft 23. The tape 73 passes around the bobbins 78 and 79 thence upward and around another bobbin 79$^a$ (Fig. 2) lying in a line with the bobbin 80 (Fig. 1) but at the other end of the printing rollers; from the bobbin 79$^a$ the tape 73 passes through the machine between the peripheral surface of the printing disc 57 and its co-acting platen 81, onward and around the bobbins 80, 82 and 83 and thence back to the driving bobbin 74. Secured in any convenient manner to the barrel of the bobbin 74 between the flanges thereof, is an annulus of felt or other suitable absorbent mat rial 74$^a$ to which a supply of ink may be applied as required in order that the ink will be constantly and evenly distributed over the inking tape 73. The 1 tation of the tape 73 will be intermittent as its movement will be governed by the intermittent movement of the sprocket wheels 33 and 32 and shaft 23.

Rigidly fastened to the flanged bearing 67 is a selective electrical contact disc 84 upon which are secured and arranged in circular formation any suitable number of terminal contacts 85 each of which pass through the disc, the screw threaded ends projecting from the underside, while the other ends 85$^a$ (Fig. 8$^d$) are flat in cross section and will lie flush with the upper surface of the disc 84. Upon the upper surface of the disc 84 is an inlaid metal ring 86 placed concentrically with the flat ends 85$^a$ of the terminals 85 and lying flush with the surface of the disc. The metal ring has a small section removed and in the space intervening between the two ends of the ring is a test contact piece 87 (Fig. 8$^d$) also lying flush with the upper surface of the disc 84. The contact piece 87 may be integral with or in electrical connection with an electrical conduction pedestal 88 provided with a terminal 88$^a$ and to which is secured an adjustable non-electric conducting bracket 89 (Fif. 4ᵈ) having two terminals 90 and 91, the screws of which pass through and project beyond the opposite face of the bracket 89 as shown at Fig. 4.

The bracket 69 (Fig. 9) is provided with projecting arms 92 upon which is pivotally mounted a short shaft 93 having a control lever 94 and a catch lever 95 rigidly secured thereon. The control lever 94 is specially shaped, one end 94ᵃ being normally held by a spring 97 close to the minor axis of a cam 96 that is rigidly secured to the shaft that carries the type roller 40, the other end being pivotally secured to one end of a short lever 98 pivotally secured to a pedestal 99 that is screwed or otherwise securely fastened to the base plate 20ᵃ the other end of the short lever 98 being pivotally secured to a rod 100 that passes partly through a hole in the underside of the base board 20 and terminates in a press button 26 partly accommodated in a recess in the upper face of the base. The catch lever 95 is provided with a tail piece 95ᵃ (Fig. 9) to which is secured a suitably insulated bridging contact piece 101, the forward end of the lever being shaped to form a catch 95ᵇ which normally lies in immediate proximity to the periphery of the head 63 of the shaft 62 in readiness to drop behind the said head when the operating handle 25 is depressed, motion being imparted to the said catch 95ᵇ through the shaft 93 and control lever 94, spring 97 and cam 96 in each sequence of operations. Simultaneously with the dropping of the catch 95ᵇ behind the head 63 the tail of the catch lever 95 moves so as to bring the bridging contact 101 into contact with the terminals 90 and 91.

The control lever 94 and catch lever 95 being rigidly secured upon the shaft 93 movement imparted to the lever 94 must likewise be imparted to the lever 95. The control lever 94 is operated in each sequence of operations by the semirotation of the cam 96 to effect the double purpose of forcing the end 94ᵃ of the lever 94 back thereby lifting the catch 95ᵇ out of engagement with the head 63 the same movement simultaneously breaking the contact between the bridging contact 101 and the terminals 90 and 91.

Should the operating press handle be depressed in a position in which the electrical circuits cannot be completed owing to that particular recording apparatus having been cut out, as for instance in the case of a recorder for a horse that has been "scratched" the attention of the operator is drawn to his mistake by the fact that the operating handle fails to release and rise; in order to release the handle thus returning the issuer to the operative position, the press button 26 is depressed thus causing the lever 98 to move the lever 94 to the position shown by dotted lines Fig. 9 such movement partly rotating the shaft 93 to which the lever 95 is rigidly secured, raising the catch 95ᵇ which releases the head 63 when the spring 59 will return the handle 25 and with it the shaft 62 to their normal position. The paper feed, printing of the general matter and authentication numerals, letters or characters and the cutting off and ejection of the ticket are controlled by an electro-magnet 102 that is rigidly secured in any suitable manner between the side members 35 and 35ᵃ of the frame. The armature 103 is provided with side extensions 103ᵃ and 103ᵇ which project through slots 104 and 104ᵃ cut in the side members of the frame to enable the extensions and their connections to reciprocate as the electro-magnet is energized and deenergized.

The operation of feeding the paper into the machine the general matter printing and ejection of the ticket is directly regulated by the cam 48 and the gear wheel 105 (Fig. 7), the cam 48 being secured to the outer face of the gear wheel 105 by screws or in any other appropriate manner the cam 48 being normally controlled by the electro-magnet 102. To the outer face of the sprocket wheel 33 is suitably secured a gear wheel 106 adapted to mesh with and bearing a definite ratio to the gear wheel 105 which is rotatably mounted upon a stud shaft 107 rigidly secured to the side member 35 of the frame. The cam 48 is provided with internal and external circumferential faces upon each of which are cut three equidistant stops 108 and 109 respectively, those upon the inner circumferential face being slightly in advance of those upon the outer circumferential face in the direction of travel. The stops 109 engage a specially shaped toothed catch 111 which is pivoted at 112 to the side member 35 and is provided with an arm 113 having an anti-friction roller 114 suitably mounted near its extremity. The anti-friction roller 114 engages with a circumferential face cam 115 which is rigidly secured by the pin 115ᵃ to, and moves with, the armature extension 103ᵃ as the electro-magnet is energized and deenergized. The stops 108 are engaged by the catch 110 which is rigidly secured to a release lever 27 (Fig. 7) the lever being pivoted at 117 to a small bracket 117ᵃ that is secured by means of screws to the base plate 20ᵃ in any suitable manner, the release lever 27 passing through an aperture in and projecting above the upper face of the base board 20. A forked lever 118 is pivoted at 118ᵃ to the release lever 27, the length of the said lever 118 being such that the armature extension 103ᵃ will lie within the fork thereof so that as the electro-magnet 102 is energized the resultant movement of the armature 103 and its extension 103ᵃ will depress the forked lever 118 thus moving the release lever 27 and causing the disengagement of the catch 110 from any one of the stops 108. The toothed catch arm 113 and the release lever 27 will be provided with pins 119 and 120 respectively to each of which one end of a coil spring 121 in tension will be suitably attached, the tendency of such spring being to keep the catches 110 and 111 in engagement with their co-acting stops 108 and 109 and at the same time to retain the anti-friction roller 114 in contact with the face of the cam 115 and to keep the fork of the lever 118 in engagement with the armature extension 103$^a$. The operating straight face 115$^a$ of the cam 115 will be set at an angle such that as the cam is moved bodily with the armature extension 103$^a$ the inclined face of the cam permits the spring to draw the tooth of the catch 111 into engagement with the stop 109.

In each operation of issuing a ticket the gear wheel 105 is caused to make one third of a revolution by one half a revolution of the gear wheel 106. Normally the catch 111 is disengaged from any of the stops 109 but the catch 110 will be in engagement with one of the stops 108 thus preventing for the time being, the movement of the printing and ejecting roller. When the electro-magnet 102 is energized, the consequential movement of the armature 103, its extension 103$^a$ and cam 115, the inclined face 115$^a$ of the cam permits the inward movement of the roller 114 carried by the arm 113, thus dropping the catch 111 a short distance in advance of a stop 109 so that as the extension 103$^a$ is nearing the limit of its movement and engages with the bottom of the recess 118$^b$ between the forks of the arm 118 it will move the lever 27 upon its pivotal point 117 and force the catch 110 out of engagement with the stop 108. The gear wheel 105 is then free to make a slight forward movement until the cam 48 engages with the catch 111 and is held momentarily in that position, but the slight movement has carried the catch 110 a short distance behind the stop 108 so that when the electro-magnet is de-energized and the armature 103 is returning to its normal position the catch 111 is disengaged from the stop 109 by the cam face 115$^a$ forcing the roller 114 and its arm 113 outwardly. Immediately the catch 111 is disengaged from the stop 109 the gear wheel 105 is free and will be caused to rotate, by the gear wheel 106, until it is again stopped by the catch 110 coming into engagement with the next stop 108. The printing of the authentication numerals, letters or characters upon the ticket, which will be hereinafter explained takes place synchronously with the disengagement of the catch 110 from the stop 108, and the sequential partial rotation of the gear wheel 105 will cause the gear wheel 124, that drives the ejecting rollers 122, 123 and 123$^a$ to rotate and thus eject the ticket.

It has now been shown that the catch 110 controls the mechanical movement of the machine the catch 111 merely preventing movement momentarily while the catch 110 is released from a stop 108. When the machine is in use the main driving shaft (not shown in the drawings) will be in constant motion. Upon this driving shaft will be mounted a driving pulley which will be connected by belt to the pulley wheel 32$^a$ to which the friction clutch 36 is secured. The sprocket wheel 32 being keyed to the shaft 23 and connected by a sprocket chain 24 to the sprocket wheel 33 the rotation of the shaft 23 will be governed by the catch 110, through the gear wheels 105 and 106. When the catch 110 is in engagement with the stop 108 and while the catch 111 is momentarily in engagement with the stop 109 the shaft 23 will be stationary, the friction clutch 36 and its pulley wheel 32$^a$ meanwhile freely rotating upon the shaft 23 in readiness to grip that shaft and take up its work immediately the gear wheels 105 and 106 are free to rotate or partly rotate. It will therefore be seen that when the lever 27 is moved by the operator so as to disengage the catch 110 from the stop 108 the gear wheels 105, 106, 33, 124, 43, 45, 46 and 47 will be caused to rotate and drive the rollers 37, 38, 39, 40, 41, 122, 123 and 123$^a$ thus enabling a length of paper to be fed in through the bell mounted guide Z between the pairs of rollers 40—41 and 37—38 thence through the passage 150, between platen 81 and the peripheral surface of the selective and supplementary printing discs 57 and 132 onward to the ejecting rollers 122—123 and out through the orifice 31. The lever 27 therefore affords a means whereby the paper may be first fed into the machine preparatory to printing and issuing authenticated tickets.

With the ticket ejecting rollers is combined a means for imprinting a definite cancellation mark along the entire length of printed but uncut tickets that are issued when the release lever 27 is brought into operation. The ticket ejecting rollers consist of an upper roller 122 and two lower rollers 123 and 123$^a$ which are mounted within an orifice cut in the base board 20 surrounding an orifice on the base plate 20$^a$ at a position such that the point of contact between the upper and lower rollers will lie in a line with the space between the platen 81 and the adjacent peripheral surface of the printing disc 57. Two blocks 125 and 125$^a$ are secured to the base plate 20$^a$ by means of screws, and to one end of such blocks is secured a plate 125$^b$. Loosely fitted between the blocks 125 and 125$^a$ is a yoke piece 126, the two side members of which and the blocks 125 and 125$^a$ are bored in the same axial line to accommodate the shaft 122$^a$ to which is rigidly secured one of the ejecting rollers 122, the holes in the side members of the yoke 126 being slightly elongated as at 126ᵃ to enable the yoke to be capable of a limited longitudinal movement. To one side member of the yoke 126 is rigidly secured a hollow stud shaft Y upon which is rotatably mounted the ejecting roller 123 and in an axial line with the hollow stud shaft Y a solid headed stud shaft 127 is rigidly secured to the opposite member of the yoke 126. Rotatably mounted upon the stud shaft 127 is another ejecting roller 123ᵃ and both it and the ejecting roller 123 are maintained in frictional contact with and are caused to rotate by the roller 122 by the coil spring W, one end of which is attached to a stud pin V rigidly secured to the base plate 20ᵃ, the other end being suitably secured to a pin T that passes through a perforation in the plate 125ᵇ and is rigidly secured to the yoke 126 at U the elongated holes 126ᵃ in the side members of the yoke 126 through which the shaft 122ᵃ passes enabling the rollers 123 and 123ᵃ to automatically adjust themselves while maintaining frictional contact with the main ejecting roller 122. The block 125 is provided with an orifice S that registers with the hole in the hollow stud shaft Y thus forming a passage through which a rod R may pass and be free to move laterally. At one end of the rod R is rotatably mounted a bobbin Q provided with a suitable annular inking pad Q¹, the other end being bent at R¹ to enable it to be passed through a hole in a plate P where it is secured by a set screw O. The plate P is pivotally secured at one end upon a stud pin N that is rigidly secured to the base plate 20ᵃ, the other end being provided with a stud pin M¹, to which is pivotally secured a connecting rod M the other end of which is pivotally secured to the lever 27 at N² (Fig. 3). If necessary the ends of the yoke 126 may be slotted to receive inwardly projecting tongue pieces integral with small plates 127ᵃ that are secured to the ends of the blocks 125 and 125ᵃ by means of screws 127ᵇ.

The movement of the lever 27 against the action of the spring 121 will move the connecting rod M and plate P so as to cause the rod R to act as a lever so as to bring the inking pad Q¹, with its bobbins Q, into contact with the roller 122. It will thus be seen that whenever the lever 27 is released for the purpose of feeding a length of paper through the machine without operating the recording mechanisms, the ticket paper will have received the imprint from the printing rollers 37 and 40, but as the paper passes through the ejecting rollers 122, 123, 123ᵃ it must receive a longitudinal cancellation mark by passing between the roller 122 and the inking pad Q¹.

In order to protect those portions of the rollers 122 and 123 and the adjacent mechanism, a shallow metal cover 128 (Fig. 4) is rigidly secured to the upper surface of the base board 20 by any suitable means. The cover 128, is provided with a long narrow opening 31 through which the ticket is ejected by the rollers 122—123. The opening 31 lies parallel with and adjacent to the line of contact between the rollers 122—123 the longitudinal edges 31ᵃ of the opening being bent inwardly towards those rollers to ensure that each ticket ejected by the rollers shall pass through the opening 31.

In certain cases it may be desirable to dispense with the means, hereinafter described, for automatically cutting off each ticket length and in such instances a knife 130 may be secured to one of the longitudinal edges of the opening 31 by means of screws 131 or the longitudinal edge itself may be formed into a knife so that as the ticket length is projected through the opening 129 by the rollers 122 123 123ᵃ it may be torn off against the edge of the knife by the operator in a manner that will be readily understood.

At Figs. 8ᵇ and 8ᶜ a supplementary printing disc 132 is illustrated, both views being on a large scale in order to more clearly show its construction. The printing disc 132 is of a smaller diameter than the disc 57, but will be mounted in a position that will enable any of the numerals, letters or characters 133 upon the peripheral surface of the disc to be brought into alignment with the numerals, letters or characters 56 upon the printing disc 57 by turning the disc 132. A portion of the underside of the base board is cut away at 134 to accommodate a washer-like bearing 135 which is rigidly secured to the metal plate 20ᵃ by screws. The printing disc 132 is rigidly secured to a short shaft 136 which passes through a hole in the base plate 20ᵃ and bearings, the upper extremity being screw threaded at 136ᵃ to engage with a thread in the nut 137. The nut 137 is provided with a flange which acts as a dial 29 upon which are numerals, letters or characters 139 corresponding with the numerals, letters or characters 133 on the disc 132. The nut is also provided with a slot 140 to enable it to be turned by means of a suitable key. Keyed to the shaft 136 and interposed between the disc 132 and plate 20ᵃ is a star positioning wheel 141 the separations of which are engaged by a pawl 142 which is pivoted at 143 to the underside of the base plate 20ᵃ and is retained in engagement with the wheel 141 by means of a coil spring 144 one end of which is secured to the pawl the other end being suitably fixed to the underside of the plate 20ᵃ. Upon the upper face of the base board 20 is a pointer 29ᵃ which points to the numeral, letter or character upon the dial 29. The numerals, letters or characteres are so arranged upon the dial 29 and disc 132 that when the disc and dial are turned by the key the numeral, letter or character to which the pointer points will indicate the numeral, letter or character upon the disc 132, that has been placed in the printing position.

Securely fastened to the uppermost face of the printing disc 57 is a plate spring 146 adapted to press against the yoke 147 of a bridging contact in order to maintain it in frictional contact with the selective contact disc 84, the position of the contact being such that as the printing disc 57 is rotated by the handle 25 the radius of the circle decribed by one pole 147$^a$ will coincide with the radius of the ring 86, while the radius of the circle described by the other pole 147$^b$ will coincide with the radius of a circle passing centrally through the contacts 85$^a$. In the drawings the method of arranging this bridging contact consists in securing a piece of suitable insulation material 148 across the opening 149 (Fig. 8) cut in the disc 57 and passing the two members 147$^a$ and 147$^b$ of the bridging contacts through holes bored in the insulation material 148, the yoke 147 electrically connecting the members 147$^a$ and 147$^b$; these latter members will be of sufficient length to ensure that the yoke 147 will not rest upon the part 148 thus enabling a rubbing contact to be at all times maintained between the bridging contact and the selective contact disc 57 by the spring 146.

Reference will now be made more particularly to Fig. 5 its subsidiary Figs. 5$^a$, 5$^b$, 5$^c$ and Fig. 6 of the accompanying drawings which illustrate the electric trip switch that is opened by the electro-magnet 102 and closed by means of two cams 151 and 152 that are mounted upon the end of the shaft 34 that is extended beyond the outer face of the part 35$^a$ of the frame for that purpose. The electric trip switch consists of two arms the main one 153 of which is pivoted at 154 to the frame 35$^a$ and is provided with a suitably shaped piece of electric insulation material 155 secured thereto by means of a screw 156. The arm 153 is also provided with a tail piece 157 adapted to engage with a tripping pawl 158 which is suitably pivoted at 159 to the side 35$^a$ of the frame. A coil spring 160 in tension is secured at one end to the side 35$^a$ of the frame its other end being connected to a tail piece 157, the tendency of such spring being to pull the tail piece in a direction that will cause the arm 153 to break the electrical circuit when the tail piece 157 is released by the tripping pawl 158.

The insulating piece 155 is provided with an electric contact conducting strip 161 that is electrically connected with the terminal 162 through the bow spring 163, the terminal 162 being secured to an electric insulating block 164 secured to the side 35$^a$ of the frame by means of the screw 165. The bow spring 163 being situated below the pivotal point 154 assists the spring 160 to make a quick break in the electric circuit as well as acting as an electric lead when the circuit is complete. The second trip switch member 166 of the trip switch is integral with an arm that forms a catch 167 that engages with one of the stops 151$^a$ on the cam 151 in each sequence of operations. The trip switch member 166 with its catch 167 is loosely mounted upon the shaft 37$^a$ in any convenient manner and is held in its normal position by means of a coil spring 168, in tension, one end of which is secured to a pin 169 rigidly secured near the pivotal point of the member 166 the other end being secured at 170 in any suitable manner to the side 35$^a$ of the frame. Normally the spring 168 performs the double function of maintaining contact between the electric contacts on the trip switch arms 153 and 166 and of keeping the catch arm 167 in frictional contact with the cam 151. The trip switch arm 166 is provided with an insulation piece 171 through which an adjustable contact screw 172 is passed in such a manner that it will make electric contact with the contact strip 161 when the arms 153 and 166 are in their normal position. The contact screw 172 is electrically connected to a terminal 173 through a curved spring 174 and metal strip 175 securely fastened around the end of the electric insulation piece 171.

The catch pawl 158 is provided with a tail piece 176 to which is rigidly secured a stud pin 177 adapted to engage with the fork of a lever 178 pivotally connected to the armature extension 103$^b$. To a pin 179 projecting from the tail piece 176 is connected one end of a coil spring 180 in tension the other end being secured at 181 to the side 35$^a$ of the frame, the function of this spring being to ensure that the point of the tail piece 157 will engage with the catch pawl 158 when the arm 153 of the trip switch is returned to its normal position by the cam 152 making frictional contact with an anti-friction roller 182 carried by the arm 153 each time the cam 152 is caused to make a one half revolution.

The mechanical counter 30 is provided with a lever 183 that is pivotally connected at 183$^a$ to one end of a link 184 the other end of which is pivotally connected to the armature extension 103$^b$ thereby recording upon the mechanical counter each movement of the armature whether it be for the issue of an authenticated ticket or a machine "test" ticket.

The sides 35 and 35$^a$ of the frame are connected together by a yoke 185 (Figs. 7$^a$ and 7$^b$) provided with a centrally situated boss 186 having a circular guide orifice through which a rod 187 that is rigidly secured to the armature 103 may freely move longitudinally as the electro-magnet 102 is energized or de-energized.

Secured near the inwardly curved portions 188 (Fig. 4ª) of the sides 35 and 35ª of the frame, by means of the screws 189, is a flat metal plate 190 in which is a transverse opening 191 through which the paper will pass. The plate 190 is the co-acting member of a guillotine knife 192 that is rigidly secured to a rod 193 securely fastened to the armature 103 by a screw 194. A collar 195 having a pin 196 is rigidly secured to the rod 187 for the purpose of carrying a coil spring 197 that encircles the pin 196 and is held in compression between the collar and the rod 193, the pin 196 projecting through a hole in the rod 193 to form an anchorage for one end of another coil spring 198 the opposite end of such spring being secured at 199 to the yoke 185. The spring 197 keeps the knife 192 firmly pressed against the plate 190 and so ensures the proper functioning of the co-acting cutting edges. The platen 81 is secured to a plate 200 having a hollow boss 201 in which the inner end of the rod 187 is secured by a pin 201ª. When the electro-magnet 102 is energized the sharp inward movement of its armature 103 will stamp the platen against the back of the paper pressing it against the ribbon 73 that is interposed between the paper and the type 56 on the printing disc 57 and also the type 133 on the printing disc 132 thus imprinting the authentication numerals, letters or characters upon the ticket. The same movement of the armature 103 will move the rod 193 longitudinally against the action of the spring 198 thus causing the knife 192 to cut that portion of the paper strip projecting through the orifice 191 such cut off portion forming the ticket to be issued by the subsequent sequential movements of the machine. Immediately the electro-magnet 102 is de-energized the spring 198 will return the armature 103 and its connections to their normal positions.

In some cases it may be desirable to dispense with the guillotine knife 192 and its associated parts 189, 190, 191, 193, 194 and 197 and this may be done without impairing the efficiency of the machine. In such a case the cutter 130, would be secured to the case the cover 128 near the orifice 31 as previously described.

At Fig. 10 of the drawings is illustrated, in diagrammatic form, the electrical wiring system connecting the ticket issuing machine through the individual horse totalling machines 202 and the grand totalling machine 203 to the electrical supply leads 204 and 204ª and illustrating the method by which the horse totalling machines 202 and grand totalling machine 203 may be cut out of the electrical circuit and the ticket issuing machine connected directly to the electrical supply leads 204 and 204ª for test purposes. The diagram illustrates the positions of the various electrical connections in the test position. Each of the selective contact terminals 85 will be electrically connected to an individual horse totalling machine 202 all of which will be electrically connected through a lead 202ª and a switch 129 to a supply lead 204. In order to more clearly illustrate the electrical connection to the trip switch the leads are shown connected to the contact 161 and terminal 172 instead of to the terminals 162 and 173. The terminal 172 is connected by a lead 210 to one blade 205ª of a double pole knife switch 205 while the terminal 90 will be connected by a lead 211 to the other blade 205ᵇ. The function of the double throw switch 205 is to close a circuit from the terminal 172 through a lead 215 direct to the positive supply lead 204ª or to the supply lead through a lead 214 relay 206 rotary distributor 207 and grand totalling machine 203, and also to close a circuit from the terminal 90 through the lead 211 switch blade 205ᵇ, lead 213 to the terminal 88ª or from the terminal 90 through leads 211 and 212 to the common ring 86. One of the leads 208 from the electro-magnet 102 will be connected to the terminal 91 the other lead 209 being connected to the contact 161.

The rotary distributor 207 is a well known electrical appliance and will be used where two or more ticket issuing machines are connected so as to register the tickets issued by each issuer upon the same horse totalling machines 202 and grand totalling machines 203.

In the ticket issuing machine illustrated in the accompanying drawings provision is made for recording the numbers of tickets issued in respect of each horse in a race up to a total of 24 horses. Each of the selective numerals 28ª and 28ᵇ (Fig. 3) will have a corresponding selective terminal 85 (Fig. 10) and each selective terminal may be electrically connected by a lead 202ª with a horse totalling machine 202 although for the sake of simplifying the drawings only five horse totalling machines have been shown. In addition to the selective numerals 28ª and 28ᵇ a test position is provided and this is indicated by the letter T on the inner curve of selective characters in the selective index 28. The selective character T has its corresponding terminal 85ᵇ which is electrically connected to the common lead 204 by the lead 216.

In order to enable any of the horse totalling machines to be cut out of electrical circuit with the issuing machine a switch 129 is inserted in the lead 202$^a$ preferably between a recording machine 202 and the lead 204.

In order to illustrate the operation of the machine one sequence of movements will be described, it being presumed that the pulley wheel 33$^a$ and its clutch 36 are being driven and are rotating upon the shaft 23 in readiness to clutch and drive that shaft immediately the gear wheel 105 is free to rotate by the momentary removal of the catches 110 and 111 from their respective stops 108 and 109. It will also be presumed that the handle 25 (Fig. 3) has been rotated to a position such that the sighting orifice 54 lies immediately above the letter T on the selective index 28, that the supply leads are connected to any suitable source of electric supply and the paper has previously been fed in through the bell mouthed intake Z and lies between the periphery of the printing disc 57 and platen 81. When the handle is in the position just described the printing disc 57 will have been rotated with the handle 25 and the character type 56 thereby brought into the printing position will be the word "Test". By the same movement the rubbing contact pieces will have been rotated so as to bring one of the members 147$^a$ into electrical contact with the test contact 87 and the other member 147$^b$ into electrical contact with the "test" terminal 85$^b$ (Fig. 10). The operator will now depress the handle 25 and the pin 52 will enter the corresponding perforation 55 in the selective index 28 while the round head 63 of the shaft 62 will be forced into the position shown by dotted lines at Fig. 9 when the catch 95$^b$ will drop behind the head 63, thus preventing the handle from rising, at the same time throwing the bridging contact 101 into electrical contact with the terminals 90 and 91 thus closing the electric circuit from the supply lead 204$^a$, lead 215, switch blade 205$^a$, lead 210, trip switch 172—161, lead 209, electro-magnet 102 lead 208 to terminal 91, thence to the return lead 204 through the bridging contact 101, terminal 90, lead 211, switch blade 205$^b$, lead 213, terminal 88$^a$, pedestal 88, test contact 87 (Fig. 8$^d$) rubbing contacts 147$^a$—147$^b$, terminal 85$^b$ and lead 216.

Figure 2:
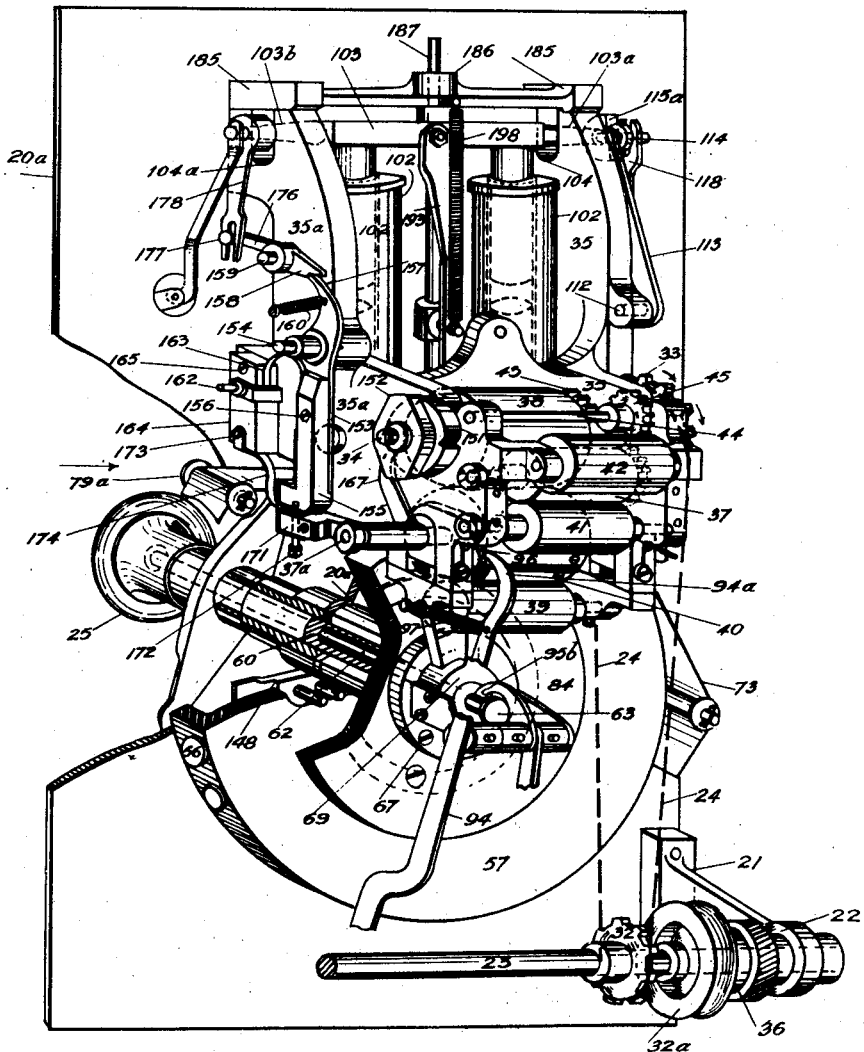

The movement of the armature 103 and its extensions 103$^a$ and 103$^b$ consequent upon the electro-magnets being energized by the electric current, causes various mechanical parts to be set in motion, and as the movement is a quick snappy one, it will synchronously stamp the platen 81 and the intervening ticket and inking tape down upon the type 56 causing, in this case, the word "Test" to be imprinted upon the ticket in the space left for that purpose, while the guillotine knife 192, carried by the rod 193 that is secured to the armature 103, will cut a ticket length as the knife slides down the co-acting plate 190 past the opening 191. The inward movement of the armature extension 103$^a$ releases the catch 110 and drops the catch 111 a short distance ahead of the stop 109 so that the gear wheel 105 will be free to, and will move that short distance up to the catch 111. This slight rotary movement of the gear wheel will have caused the stop 108 to pass the catch 110 in readiness to allow the gear wheel to rotate one third of a revolution until its movement is again arrested by the catch 110 coming into contact with the next stop 108. The outward movement of the armature extension will immediately release the catch 111 from the stop 109 when the gear wheel 105 will be free to make the one third rotary movement just referred to. As the sprocket wheel 33 will also be free to rotate the friction clutch 36 will clutch and drive the shaft 23, sprocket wheel 32 and chain 24 thus causing the sprocket wheel 33 to make a one half revolution in the direction shown by the arrows (Fig. 2). The partial rotation of the sprocket wheel 33 will cause all the printing, inking and platen rollers, 38, 37, 40, 41 and 42 and the ejecting rollers 122 and 123 to rotate in a manner previously explained. The semirotary movement of the roller 40 and its shaft causes the cam 96 to make a similar movement and in doing so forces the end 94$^a$ of the control lever 94 outwardly to the position shown by dotted lines (Fig. 9) thus partly rotating the shaft 93 and with it the catch lever 95, disengaging the catch 95$^b$ from the head 63 of the shaft 62 and simultaneously breaking the contact between the bridging contact 101 and the terminals 90 and 91. The completion of the movement of the cam enables the coil spring 97 to return the control lever 94 and catch lever 95 to their normal position as shown at Fig. 1. The semirotation of the printing, inking and platen rollers, 38, 37, 39, 40, 41 and 42 prints the desired text upon both sides of the ticket but as the movement of these rollers is synchronous with the movement of the ticket ejecting rollers 122 and 123 it will be seen that a printed ticket length moves into place between the platen 81 and the periphery of the printing disc 57 simultaneously with the ejection of the fully printed and detached ticket and will remain there in readiness to receive the "test" or authentication imprint in the next sequence of operations and prior to its ejection.

The same movement of the armature 103 and its extension 103$^a$ just referred to depresses the link 184 and lever 183 to the position shown by dotted lines in Fig. 5 thus registering that movement upon the mechanical counter 30, while it also results in other movements being brought about by the movement of the extension 103$^b$. Toward the end of the inward movement of the forked lever 178 the base 218 of the recess formed by the fork engages the stud pin 177 repressing the tail piece 176 against the action of the spring 180, thereby raising the catch pawl 158 and releasing the tail piece 157 of the arm 153 of the trip switch. The coil spring 160 then operates so as to draw the tail piece 157 towards it upon the pivotal point 154 thus throwing the opposite end outwardly and breaking the electrical connection between the contacts 161 and 172. The breaking of this electrical connection is synchronous with the release of the catch 111 from the stop 109 and is immediately followed by the semirotation of the various printing, inking, platen and ejecting rollers, the rotation of the roller 38 and its shaft 34 causing the cams 151 and 152 to make a semirotary movement. The rotation of the cam 151 will force the catch arm 167 outwardly upon its pivot 37$^a$ against the action of the springs 168 and 174 thus moving the arm 166 away from the other member 153 of the trip switch and holding it in that position until the cam has completed the semirotary movement when the point of the catch arm 167 will be forced into a recess 151$^a$ by the action of the spring 168. The semirotation of the cam 152 engages the antifriction roller 182 on to the arm 153 and forces the arm back to its normal position where its tail piece 157 is again held in engagement with the catch pawl 158 by the spring 160, the breaking of the electrical connection between the contacts 161 and 172 having de-energized the electro-magnets 102 thus permitting the springs 198 to return the armature 103 and its connections to their normal position and leaving the tail piece 176 free to be positioned by the spring 180 ready to engage the tail piece 157 immediately it is returned to its normal position. The relative positions of the cams 151 and 152 are such that the cam 152 returns the arm 153 before the cam 151 returns the arm 166 to the normal position. For this purpose the recesses 151$^a$ are positioned at right angles to the major diameter of the cam 152.

I claim:—

1. A ticket printing and issuing machine comprising rotatable means adapted to intermittingly feed to said machine a strip of paper from a roll thereof and optionally during such feed to print matter on ticket portions of said strip, and means for printing authentication marks on said ticket portions, and also means for cutting and ejecting from said machine said printed ticket portions, the combination of releasable means to lock said rotatable means against rotation, a press handle, an electric circuit, electro-magnetic means interposed in said circuit and controlled by said press handle, said electro-magnetic means acting to release the locking means associated with said paper feed means whereby the latter may be partially rotated together with the means for ejecting said printed ticket portions, means operated by the electro-magnetic means before said ejection occurs to print the authentication marks on said ticket portions, and means for re-establishing normality of said electric circuit and said electro-magnetic means.

2. In a ticket printing and issuing machine according to claim 1, the combination of a mechanical counter, said counter being associated with said electro-magnetic means and adapted upon the operation of the latter to register the issue of all said ticket portions before they are ejected from said machine.

3. In a ticket printing and issuing machine according to claim 1, the combination of means adapted to register separate tickets of different denominations indicated by said authentication marks and of means for registering the totals of all tickets issued through the said machine, both said registrations being effected simultaneously with the recording of said issues on said mechanical counter and the said registering means being primarily operated by and simultaneously with the closing of the electric circuit containing the said electro-magnetic means.

4. In a ticket printing and issuing machine having rotatable means adapted to intermittingly feed to said machine a strip of paper from a roll thereof and optionally during such feed to print matter on ticket portions of said strip and also having means for printing authentication marks on said ticket portions, and means for cutting and ejecting from said machine said printed ticket portions, the combination of a cam which normally is prohibited rotation but which is released for partial rotation by the energization of electro-magnetic means associated with an electric circuit which is normally open but is closed by the operation of a rotatable press handle associated with an index and part of the said means for printing said authentication marks, means for partially rotating said cam upon its release and said matter printing means, means for breaking and reestablishing normality of said electric circuit, and means for reinstating the said electro-magnetic means in normal position to restrain further rotation of said cam until said electric circuit is again closed.

5. In a ticket printing and issuing machine provided with rotatable means adapted to intermittingly feed to said machine a strip of paper from a roll thereof and optionally during such feed to print matter on ticket portions of said strip, means for printing authentication marks on said ticket portions, and means for cutting and ejecting from said machine said printed ticket portions, the combination of a release key connected to a lever having pivoted thereto a second lever having a fulcrum between its opposite ends, a catch arm pivoted on said fulcrum and carrying an electric contact device for establishing an electric circuit which is normally open, and a press handle adapted when pressed towards said catch arm to be engaged by the latter and to be restrained thereby from returning to normal position unless an electric circuit is established through said press handle and contact device or by the manual operation of said release key to move said second lever and simultaneously to move said catch arm out of engagement with said press handle.

6. In a ticket printing and issuing machine which is furnished with rotatable means adapted to intermittingly feed to said machine a strip of paper from a roll thereof and optionally during such feed to print matter on ticket portions of said strip, the combination of means for printing authentication marks on said ticket portions, said means including a circuit, electro-magnetic means in said circuit, means for cutting and ejecting from said machine said printed ticket portions, a selective press handle and index associated with part of said means for printing said authentication marks whereby each of the latter may be brought to printing position by the rotation of said press handle over said index, means associated with said part of said means for printing said authentication marks whereby said electric circuit is closed upon said handle being depressed to enable said authentication marks to be printed on said ticket portions, and means actuated by the electro-magnetic means for breaking and for re-establishing normality of said electric circuit.

7. In a ticket printing and issuing machine comprising rotatable means adapted to intermittingly feed to said machine a strip of paper from a roll thereof and optionally during such feed to print matter on ticket portions of said strip, means for printing authentication marks on said ticket portions and means for cutting and ejecting from said machine said printed ticket portions, the combination of electro-magnetic means adapted when energized through the closing of a normally open electric circuit to operate said authentication mark printing means and simultaneously with the ejection of said printed ticket portions to enable the breaking of said electric circuit whereby separate means associated with said machine and circuit may thereafter be permitted to re-establish normality of said electric circuit.

8. In a ticket printing and issuing machine provided with rotatable means adapted to intermittingly feed to said machine a strip of paper from a roll thereof and optionally during such feed to print matter on ticket portions of said strip, the combination of a release lever, a cam normally controlled by said release lever but adapted to be rotated when a stop on said lever is removed out of engagement with said cam, drive means associated with said strip feed and printing means and with said cam whereby said means and cam may be rotated upon the release of said stop from said cam, and means for imprinting on said roll of paper passed through said machine or on said ticket portions a cancellation mark before any of said roll of paper or said ticket portions are discharged from said machine.

9. A ticket printing and issuing machine comprising electro-magnetic means, rotatable means operable through said electro-magnetic means for intermittingly feeding to said machine a strip of paper from a roll thereof, said feeding means being optionally adapted to print matter on separate ticket portions of said strip during the gradual feeding thereof to said machine, means for printing authentication marks on said ticket portions part of said means being associated with said electro-magnetic means, means for cutting and ejecting from said machine said printed ticket portions, means comprising a rotatable press handle and an index, said press handle being associated with a second part of the said means for printing said authentication marks whereby said part of the latter means will be rotatable therewith to bring said authentication marks into proper register with the desired relative connection of said press handle and index, means associated with the second part of said means for printing said desired authentication marks whereby an electric circuit will be established upon the depression of said press handle to energize said electro-magnetic means to effect the print of the desired authentication marks on said ticket portions of said strip, a mechanical ticket counter associated with said electro-magnetic means adapted to be operated when the said electro-magnetic means are energized, means for breaking and for re-establishing normality of said electric circuit, and means for re-instating said electro-magnetic means in normal position.

10. In a ticket printing and issuing machine, the combination of rotatable means for intermittingly feeding a strip of paper from a roll thereof to said machine, electro-magnetic means carrying an element to which is secured a cutting knife, a stationary plate affixed to said machine with an opening therein through which said strip projects when passed through said feeding means, means whereby said feeding means are partially rotated upon the closing of an electric circuit through which said electromagnetic means are energized to move said knife to cut said strip by each movement of said knife into ticket portions, means for breaking and for reestablishing normality of said electric circuit, and means for returning said electro-magnetic means to normal position and simultaneously to retract said knife.

11. In a ticket printing and issuing machine according to claim 10, the combination with said feeding means, of means whereby as said strip of paper is being fed by said feeding means to said machine matter is printed on either or both faces of the portion of the strip passed through said feeding means.

12. In a ticket printing and issuing machine, the combination of rotatable means for intermittingly feeding a strip of paper from a roll thereof and optionally during said feed to print matter on said paper, means for cutting said printed paper into ticket portions, means for ejecting said printed ticket portions from said machine, and means coacting with the ejecting means for imprinting a cancellation mark on said ticket portions.

13. In a ticket printing and issuing machine according to claim 12, the construction in which the said cutting means consists of a knife arranged rearwardy of said means for ejecting the said ticket portions and in proximity to an opening disposed in alignment with the ejection line from said machine of said ticket portions.

14. In a ticket printing and issuing machine, the combination of means consisting of a drive bobbin carrying an inking pad, an inking ribbon extending over said bobbin, said bobbin constituting a drive for said ribbon and being supplied with printing ink from said pad, a series of separate guide bobbins, said ribbon extending over the guide bobbins and between printing elements associated with said machine, a fixed spindle for said bobbin an extension on said bobbin, a gear wheel on said extension, and a coacting gear wheel on a shaft which is subject to intermittent rotation to intermittently rotate said bobbin and intermittently drive said inking ribbon.

15. In a ticket printing and issuing machine the combination of means for feeding and optionally printing matter on ticket portions of a strip of paper fed to said machine from a roll thereof, a rotatable selective press handle, an index associated with said handle over which oppositely disposed pointers on said handle may be rotated, openings centrally of said index registering with a pair of a series of independent selected characters on said index, a disc rotatable with said press handle and having on the periphery thereof a series of independent selected characters corresponding with the selected characters of said index, electric contact means on said disc adapted to be brought into register with electric conductive means on a stationary element when said press handle is rotated over said index, said contact means being adapted upon the depression of said press handle to be brought into contact with said electric conductive means on said stationary element to enable an electric circuit to be established for the purpose of permitting the printing of a selected authentication mark on a ticket portion of a strip of paper fed from a roll thereof to said machine, means for cutting and ejecting said printed ticket portion from said machine, and means for breaking and re-establishing normality of said electric circuit.

16. In a ticket printing and issuing machine according to claim 15, the combination of a catch arm normally out of engagement with said press handle but automatically engageable thereby when said press handle is depressed, said catch arm having at one end thereof electric contact means and being pivoted to a spindle upon which a second lever is fulcrumed, electric conductive means on a pedestal attached to said stationary element, a rotatable cam associated with the said paper feed and matter printing means adapted to contact at intervals with said second lever to break the contact of said electric contact means with said electric conductive means whereby the electric circuit established by such contact is broken.

17. In a ticket printing and issuing machine according to claim 15, the combination of a catch arm normally out of engagement with said press handle but automatically engageable thereby when said press handle is depressed, said catch arm having at one end thereof contact means and being pivoted to a spindle upon which a second lever is fulcrumed, electric conductive means on a pedestal attached to said stationary element, a rotatable cam associated with the paper feed and matter printing means adapted to contact at intervals with said second lever to break the contact of said electric contact means with said electric conductive means whereby the electric circuit established by such contact upon the depression of said press handle is broken a release key connected to a lever to which said second lever is pivoted, said key being adapted when depressed to move said second lever and thereby to release said catch arm out of engagement with said press handle and to also move said second lever ont of contact with said rotatable cam.

18. A selective rotatable press handle and character index usable for a ticket printing and issuing machine, said press handle comprising a head, a spindle fastened at one end to said head and having a projection on its opposite end, a sleeve on said spindle, a disc secured to said sleeve and having on its periphery a series of selected printing characters, a coil spring in said handle adapted to normally keep said handle outwardly from said sleeve, a character index having on the face thereof a series of selected characters corresponding with the said characters on said disc, a pointer on said head having a sight hole at one of its ends and also pins extending from the opposite ends thereof either of which is adapted to be brought into register with any one of a series of openings in said index which said openings are arranged between opposite pairs of characters on the face thereof, and electric contact making means on said disc adapted when said handle is rotated with said disc to be brought into register with electric conductive means adapted when an electric circuit is established through the depression of said press handle to enable counting and registration of all separate tickets printed in and issued from said machine with said respective selected characters thereon.

19. In a ticket printing and issuing machine, the combination of a printing disc the periphery of which has mounted thereon a series of selected printing characters, said disc having secured thereon electric contact making means adapted when said disc is rotated to be brought into register with separate electric conductive means one for each said characters whereby when an electric circuit is established through the closing contact of said contact means with each said electric conductive means each of the tickets printed in said machine with the respective selected characters thereon will be issued from said machine and each said tickets will be immediately counted and registered.

20. In a ticket printing and issuing machine comprising rotatable means adapted to intermittingly feed to said machine a strip of paper from a roll thereof and optionally during such feed to print matter on ticket portions of said strip, the combination of an intermittingly partially rotatable cam associated with a gear wheel meshing with a gear wheel with which said feed and print means are associated, stop means for said cam, means connected with a constantly rotating shaft adapted to clutch drive a normally stationary shaft when said stop means are released from engagement with said cam whereby partial rotation may be communicated to said cam and gear wheels and said feed and print means by power communicated from said driven shaft, and a gear wheel meshing with the gear wheel associated with said cam whereby ejecting rollers for said printed ticket portions may also be partially rotated.

21. In a ticket printing and issuing machine according to claim 20, the combination of printing means adapted to print on each of the said ticket portions before they are ejected from said machine selected authentication characters upon each independent partial rotation of said paper feed and matter printing means.

22. In a ticket printing and issuing machine, the combination of a main frame, a positively driven ejector roller in said frame, a pair of spaced rollers driven by frictional contact with said positively driven roller, a spindle for the latter roller, a gear wheel on said spindle capable of having power communicated thereto, and a spring controlled yoke frame carrying the spindles of said frictionally driven rollers whereby they are held in contact with said positively driven roller.

23. In a ticket printing and issuing machine according to claim 22, the combination with said ejecting rollers of an inking pad, said pad being carried on an arm which is attached to pivotal means connected with means adapted either to bring said pad into contact with a ticket passing through said ejecting rollers or to keep said pad out of contact therewith.

24. In a ticket printing and issuing machine, the combination of an electric non-conductive element having a circular metal electric conductive plate arranged centrally thereof with a gap between the ends of said plate and a metal electric conductive button in said gap, a plurality of electric conductive metal elements on one face of said non-conductive element the said conductive elements extending to the other side of said non-conductive element and adapted to be wired separately in an electric circuit, electric contact means adapted to be brought into register with the said circular metal plate or with said button and with each of the respective conductive elements, a stud projecting from said non-conductive element carrying terminals of an electric circuit said terminals being insulated from said stud, and means carrying an electric contact device adapted to be made to contact with said terminals to establish an electric circuit or to be removed out of contact with said terminals to break said electric circuit.

25. In a ticket printing and issuing machine, the combination of brackets secured to an electrically insulated base plate, bearings for a normally stationary shaft on said brackets, a gear element secured upon said shaft and connected to a primary driving element in said machine whereby said primary element and other elements may be partially rotated upon the rotation of said normally stationary shaft, and a clutch drive normally free on said shaft capable of rotation thereon connected to a constantly rotating power driving shaft, said clutch drive being adapted to clutch an element on said normally stationary shaft to enable the latter to be rotated through said power driving shaft when said primary driving element is free to be partially rotated.

26. In a ticket printing and issuing machine, the combination of means consisting of a cam attached to a gear driving element, said cam having a series of inner circumferential notches and outer circumferential notches, a catch on a pivoted lever capable of engagement with said inner circumferential notches, a catch on a pivoted arm capable of engagement at one end with said outer circumferential notches, an electromagnet whose armature has oppositely extending ends, an inclined face cam on one of said ends and adapted to coact with said pivoted arm to operate the catch on said pivoted arm in its relation to said outer circumferential notches, a forked lever engaging with said latter end pivotally connected to the pivoted lever carrying the catch for said inner circumferential notches, means for printing selected authentication marks on a ticket portion of a strip of paper fed to said machine from a roll thereof, part of said means being associated with the armature of said electro-magnet, means on the oppositely extending end of said armature capable of operating a mechanical counter when said electro-magnet is energized, means for establishing an electric circuit to energize said electro-magnet whereby upon such energization taking place the operation of the said armature is capable of allowing said cam and its associated gear driving element to be partially rotated and synchronously to allow printing of said authentication marks on said ticket portions and to also allow registration on said mechanical counter of said printed tickets before they are ejected from said machine, means for breaking and for re-establishing normality of said electric circuit, and means for returning said armature to normal position.

27. In a ticket printing and issuing machine, the combination of a trip switch for breaking and for re-establishing normality of means whereby a closed electric circuit may be created, means for opening and closing said circuit, an electro-magnet in said circuit, said trip switch comprising a main pivoted catch having means associated therewith for establishing a closed electric circuit with contact making means on an insulated pivoted block, a pivoted lever associated with said block, means including a rotatable cam which coacts with said lever to trip said insulated block and subsequently to allow said block to be returned to normal position, a holding pawl for said main catch adapted to release said catch from engagement therewith to enable the electric conductive means on said catch to be placed out of contact with said contact means when said insulated block is tripped, means associated with the armature of said electro-magnet and said holding pawl respectively adapted to trip said pawl out of engagement with said main catch upon the energization of said electro-magnet, means including a rotatable cam for returning said main catch to normal position, and means for returning said pawl to normal operative position for re-engaging said main catch.

In testimony whereof I have signed my name to this specification.

HENRY ROY SETRIGHT.